United States Patent [19]

Wheeler

[11] Patent Number: 5,655,647

[45] Date of Patent: Aug. 12, 1997

[54] PASS-THROUGH CONVEYOR GATE

[75] Inventor: Tracy Eugene Wheeler, Terre Haute, Ind.

[73] Assignees: Sony Corporation, Tokyo, Japan; Digital Audio Disc Corporation, Terre Haute, Ind.

[21] Appl. No.: 439,424

[22] Filed: May 11, 1995

[51] Int. Cl.$^6$ .................................................. B65G 21/10
[52] U.S. Cl. ........................................................ 198/861.5
[58] Field of Search ................................ 198/583, 584, 198/592, 861.5, 810.01, 538

[56] References Cited

U.S. PATENT DOCUMENTS

| | | | |
|---|---|---|---|
| 68,293 | 8/1867 | Erkenbrecher | 198/861.5 |
| 4,739,868 | 4/1988 | Head | 198/861.5 X |
| 4,955,955 | 9/1990 | Driear | 198/861.5 X |
| 5,172,804 | 12/1992 | Chersin | 198/861.5 |

FOREIGN PATENT DOCUMENTS

| | | | |
|---|---|---|---|
| 233194 | 3/1961 | Australia | 198/861.5 |
| 1180134 | 6/1959 | France | 198/584 |
| 553654 | 12/1956 | Italy | 198/592 |

OTHER PUBLICATIONS

Product brochure for Hytrol, "Conveyor Accessories". (No Date)

*Primary Examiner*—D. Glenn Dayoan
*Attorney, Agent, or Firm*—Wood, Herron & Evans, L.L.P.

[57] ABSTRACT

A pass-through conveyor having a power conveyor pivotally attached to a based that effectively conveys small and light weight articles in a lowered conveying position. The powered conveyor may be pivoted to an elevated position allowing access past the conveyor gate. The conveyor is supported in an elevated position by a spring support mechanism without the need for mechanical latches or locks.

16 Claims, 3 Drawing Sheets

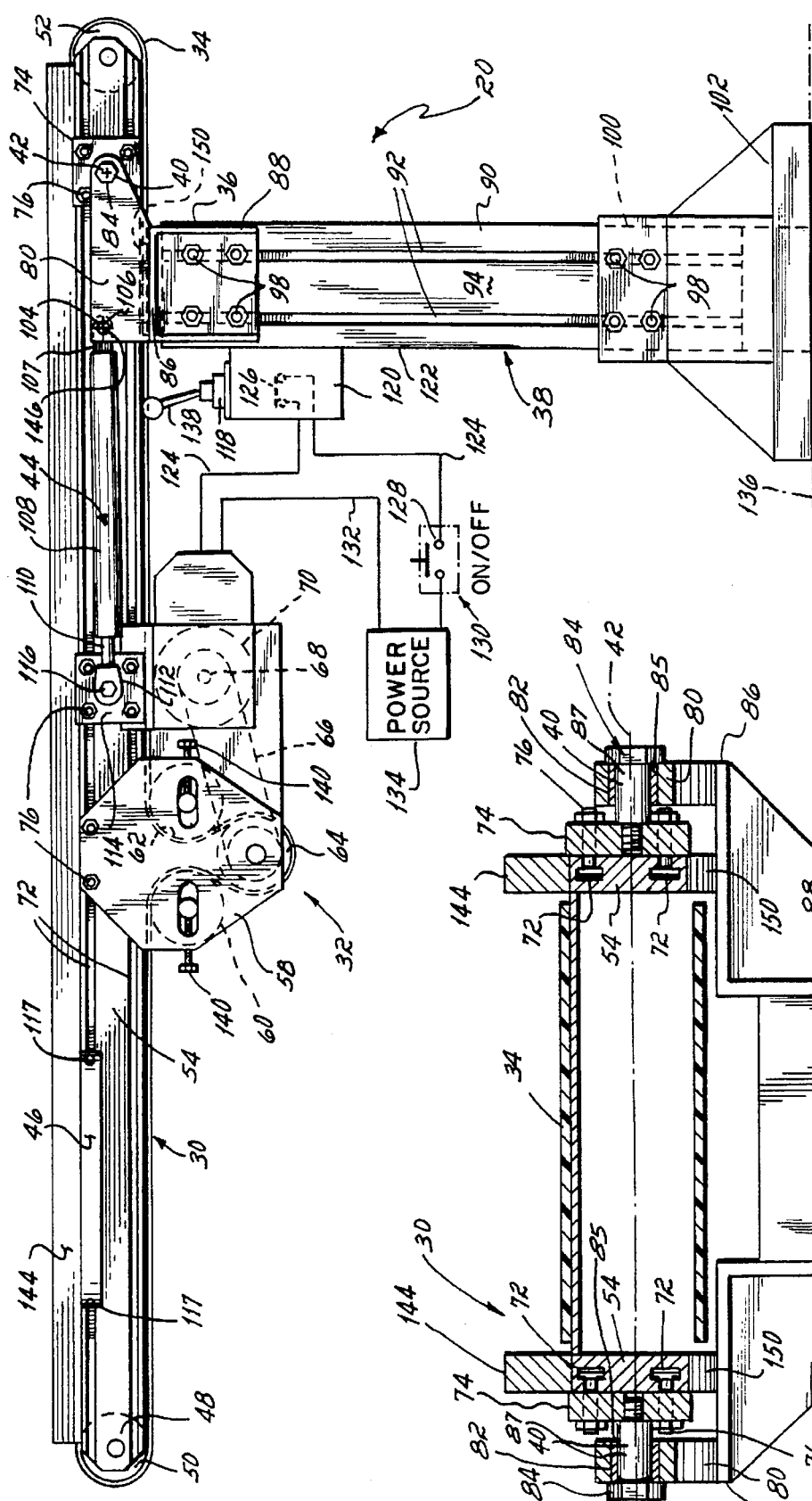

5,655,647

PASS-THROUGH CONVEYOR GATE

FIELD OF THE INVENTION

The invention relates generally to article conveyors; and more particularly, the invention provides a stand-alone pass-through conveyor gate that may be elevated to permit access past the elevated conveyor gate.

BACKGROUND OF THE INVENTION

The use of automated article handling equipment is becoming more widespread in many industries. Article handling equipment includes conveyance devices both overhead and suspended conveyors, as well as floor mounted conveyors. Floor mounted conveyors typically have a base structure which rests on, or is secured to, a floor or other structure. The conveyor base structure supports conveying elements which move articles along a conveyor path. The conveyor path may be straight, curved, or inclined up or down.

Floor mounted conveyors generally provide an uninterrupted conveyor path past and between processing stations, for example, cleaning stations, machining stations, assembly stations, inspection stations, packaging stations, and loading and unloading stations. Therefore, the conveyor path in combination with the processing stations may extend over an uninterrupted length or path of hundreds of feet. However, during the course of normal manufacturing operations and in the course of maintenance of the various pieces of equipment, it is often desired to cross from one side of the conveyor to the other. To accomplish this, bridges are often built over the conveyor. The bridge is generally of a metal construction, requires stairs at both ends and handrails and guarding, all of which results in an expensive construction simply to pass from one side of the conveyor to the other. Without a bridge, the only other practical option is to walk around one or the other of the ends of the conveyor which, of course, is time consuming.

To overcome the above disadvantage of not having access across the conveyor, it is known to take a section of conveyor and bridge that conveyor section, or gate, between the adjacent ends of two fixed conveyors, each of which is mounted on its own base structure. One end of the bridging conveyor gate is pivotally attached to an end of one of the fixed conveyors. Therefore, when it is desired to pass across the conveyor line, the other end of the bridging conveyor gate is lifted, thereby pivoting the bridging conveyor gate with respect to the one of the fixed conveyors. The bridging conveyor gate is held in its elevated position by means of a latch or locking pin that is engaged on one side of the conveyor.

While the above construction is an improvement over situations in which there is no access from one side of the conveyor to the other, it does have some disadvantages. First, the bridging conveyor gate uses gravity fed rollers which require that either the conveyor be mounted on an incline to transport articles thereacross, or the articles are pushed across the conveyor in a continuous line by the articles feeding behind them. Some, small or light weight articles either, do not have sufficient weight to be gravity fed along the rollers, or, are shaped such that they may become entangled in the rollers. Therefore, such small or light weight articles are not suitable for roller gravity feed conveyors and cannot reliably be transported across the bridging conveyor gate. Second, known bridging conveyor gates may have springs to assist in the raising of the bridge section. However, those springs will not hold the conveyor in the raised position; and the bridging conveyor gate must be manually locked in the raised position. The locking pin which is on the one side of the conveyor must be operated from that side as well as the opposite side of the conveyor. Consequently, engaging and disengaging the locking pin from the opposite side of the conveyor is highly inconvenient.

SUMMARY OF THE INVENTION

To overcome the disadvantages described above, an object of the present invention is to provide a pass-through conveyor gate that is suitable for conveying articles including light weight and small articles. Another object of the invention is to provide a pass-through conveyor gate that automatically supports itself in the elevated position.

According to the principles of the present invention and in accordance with the described embodiments, the present invention provides a conveyor gate with a generally vertical base having a lower end adapted to attach to a structure. A conveyor is pivotally connected to the upper end of the vertical base at a first location on the conveyor that is between the ends of the conveyor. The conveyor includes a motor for powering a conveying element to move articles across the conveyor. A support mechanism is connected to the conveyor for holding one end of the conveyor in an elevated position upon the one end being raised from the conveying position to the elevated position. Therefore, the conveyor gate has the advantage of being able to transport small and light weight articles thereacross.

In another embodiment of the invention, a conveyor is rotatably connected to a base. A support mechanism is connected to the conveyor for automatically holding one end of the conveyor in an elevated position, thereby permitting a generally unobstructed passage past the conveyor. Therefore, the conveyor gate has the advantage of automatically maintaining the conveyor in the elevated position without requiring latches or locks.

In one aspect of the invention, the support mechanism is a gas spring which is connected to the conveyor at a point between the first location on the conveyor and the end of the conveyor being elevated. The gas spring attaches to the upper end of the vertical base at a point which is higher than the conveyor pivot point on the base to which the conveyor is attached. Consequently, when the conveyor is moved down to the lowered conveying position, the gas spring applies a force tending to maintain the conveyor in the lowered conveying position.

These and other objects and advantages of the present invention will become more readily apparent during the following detailed description in conjunction with the drawings herein.

BRIEF DESCRIPTION OF THE DRAWINGS

FIG. 3 is a side elevation view of the pass-through conveyor in the lowered, conveying position.

FIG. 4 is a cross sectional view taken along line 4—4 of FIG. 1.

DETAILED DESCRIPTION OF THE INVENTION

Figure 1:
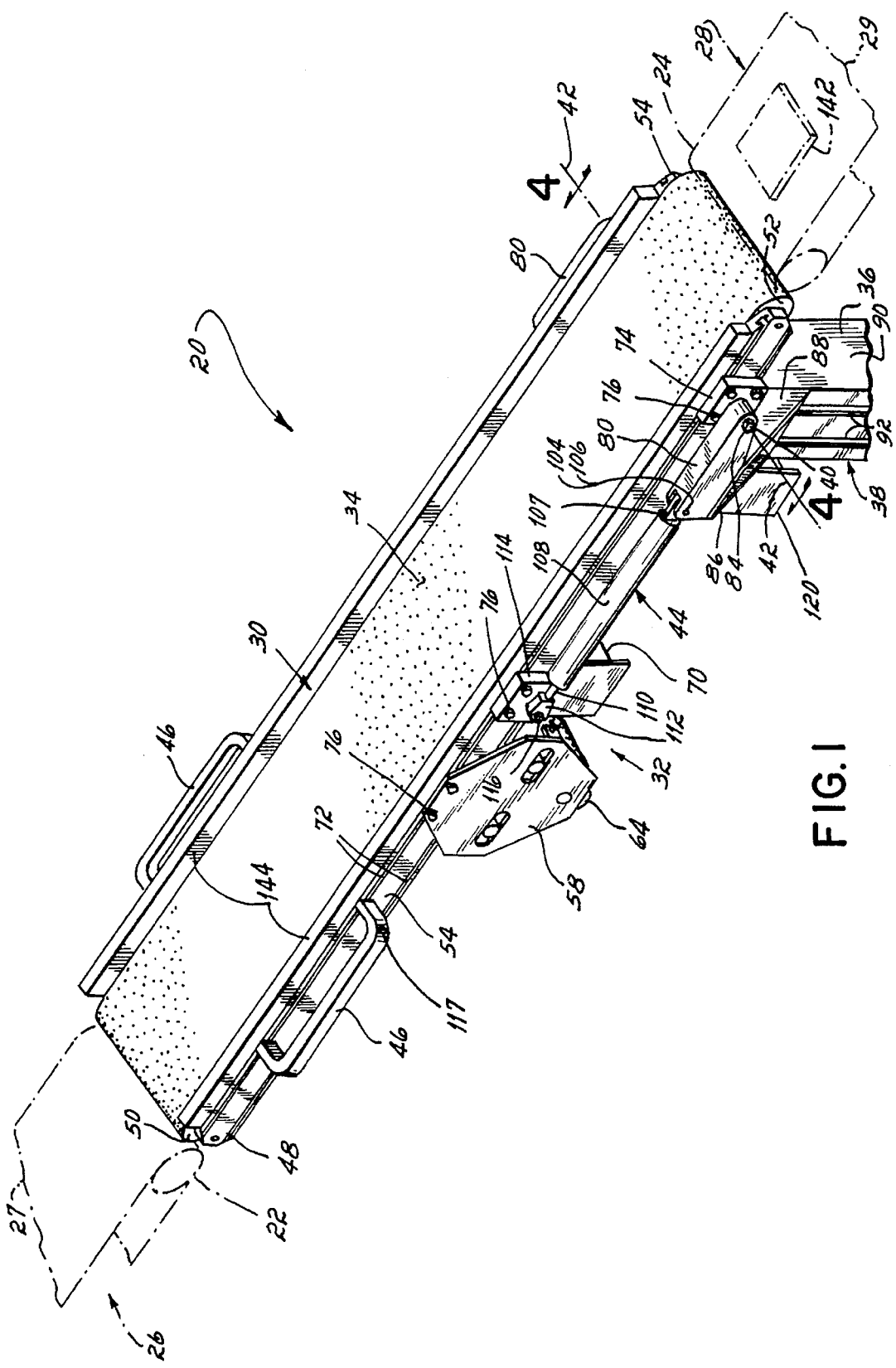
FIG. 1 is a perspective view of a pass-through conveyor gate in accordance with the principles of the present invention.
Figure 2:
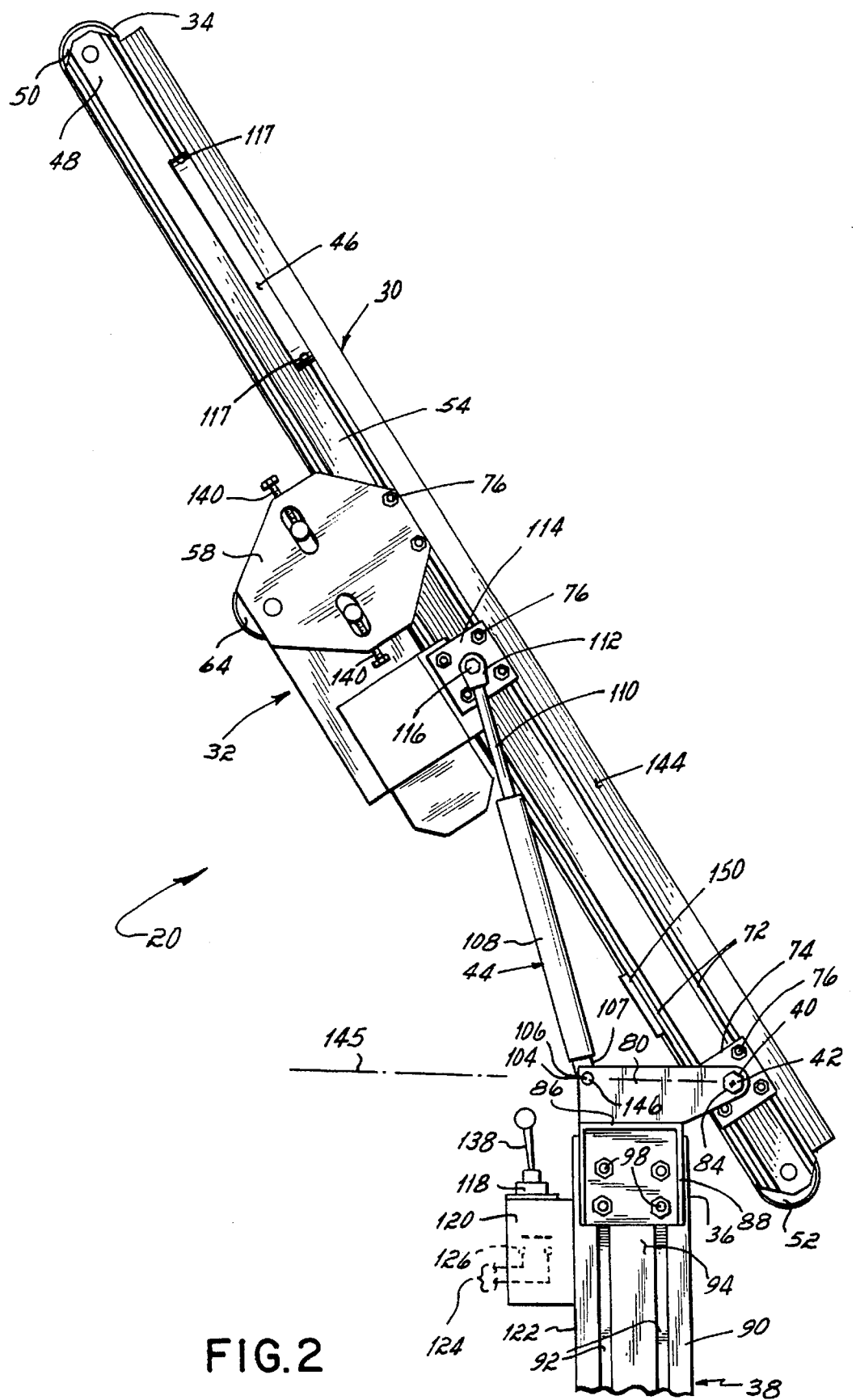
FIG. 2 is a side elevation view of the pass-through conveyor in the elevated position.

Referring to FIG. 1, a conveyor gate 20 is located between and immediately adjacent to the ends 22, 24 of adjacent fixed conveyors 26, 28. The conveyor gate 20 includes a conveyor 30 having a drive unit 32 which drives a conveying element 34 which is preferably a looped conveyor belt. The conveyor 30 is rotatably connected to an upper end 36 of a generally vertical base 38 at pivot points 40 on opposite sides of the base 38 so that the conveyor 30 is able to pivot with respect to the base 38 about an axis of rotation 42. The conveyor gate 20 includes a support mechanism 44, for example, a gas spring, that is rotatably connected at its ends to both the conveyor 30 and the base 38. The conveyor gate 20 further includes handles 46 mounted on each side of the conveyor 30 closer to an outer end 48 of the conveyor gate 20. Therefore, at any time, the handles 46 may be used to lift and pivot the outer end 48 of the conveyor 30 with respect to the axis of rotation 42 to an elevated position as illustrated in FIG. 2. The gas spring 44 is operative to hold the outer end 48 of the conveyor 30 in the elevated position without requiring latches or other locking mechanisms. Therefore, persons and vehicles are provided access past the conveyor gate 20 and from one side to the other of the fixed conveyors 26, 28. The handles 46 are subsequently used to lower the outer end 48 of the conveyor 30 from the generally vertical elevated position shown in FIG. 2 to the lowered, generally horizontal, conveying position illustrated in FIGS. 1 and 3.

Referring to FIG. 3, the conveyor belt 34 of conveyor 30 is a closed, looped belt that extends around end rollers 50, 52, each of which is rotatably connected at its ends to one end of two opposing side rails 54 extending along the sides and over the length of conveyor 30. A bracket 58 is connected to both of the side rails 54 intermediate the end rollers 50, 52. Idler rollers 60, 62 and drive roller 64 are rotatably mounted to the bracket 58 and extend across the width of the conveyor 30. The conveyor belt 34 is threaded around the idler roller 60, the drive roller 64, and idler roller 62; and the drive roller 64 is powered by a drive element 66 connected to an output shaft 68 of a motor 70. The drive element 66 may be a V-belt, chain or other known power transfer link. A center drive conveyor as described above is commercially available as an intermediate tension, intermediate drive conveyor from Jergens Nice of Cleveland, Ohio.

Referring to FIG. 4, the side rails 54 of the conveyor 30 are preferably extruded aluminum members that contain T-slots 72. Pivot blocks 74 are connected to each of the side rails 54 by T-bolts 76 which extend through the pivot blocks 74 and slide within the T-slots 72 of the side rails 54. Tightening the T-bolts 76 locks the pivot blocks 74 in a desired position along the rails 54. Each of a pair of pivot arms 80 has a bore 82 in one end thereof. A bolt 84 extends through the bore 82 of the pivot arm 80 and is threaded into a threaded hole generally centrally located on the axis 42 of the pivot block 74. Preferably, the bolt 84 is a shoulder bolt with a Teflon bearing 85 slidably mounted between the shoulder 87 of the bolt 84 and the mating 82. The pivot arms 80 are connected to and along outer edges 86 of the upper sides of angular gussets 88. The gussets 88 are in turn connected to opposite sides 94, 96 of a column 90 at the upper end 36 of the base 38.

Referring to FIGS. 3 and 4, the column 90 is preferably a square aluminum extrusion that has two T-slots 92 that extend longitudinally along each side of the column 90. The gussets 88 are attached to the opposite sides 94, 96 of the column 90 by T-bolts 98 that slide in the T-slots 92. The lower end 100 of the column 90 is mounted within a foot plate 102, preferably an aluminum casting. The foot plate 102 has a generally centrally located, square opening which is sized and shaped to receive the column 90. Further, T-bolts 98 slide in the slots 92 of the column 90 and extend through the foot plate 102. When tightened, the T-bolts 98 connect the lower end 100 of the column 90 to the foot plate 102.

Referring to FIGS. 3, the pivot arms 80 of the base 38 further include a second bore 104 and are rotatably mounted on a pin 106 connected to one end 107 of the cylinder 108 of the gas spring 44. The rod 110 of the gas spring 44 slides within the cylinder 108 and is rotatably connected at one end 112 to a pivot block 114 by means of a shoulder bolt 116. The pivot block 114 is identical in construction to the pivot blocks 74 and is mounted to one of the side rails 54 by means of T-bolts 76. The handles 46 are also mounted on the side rails 54 with screws 117 that extend through the ends of the handles 46 and thread into nuts located in the T-slots 72.

A limit switch 118 is connected to an angled bracket 120 which is attached to the side 122 of the column 90 by T-bolts (not shown) extending into T-slots (not shown) which are identical to T-bolts 98 and T-slots 92, respectively. A power lead 124 connected to the motor 70 is connected to a pair of contacts 126 within the limit switch 118, and the power lead 124 is further connected to the contacts 128 of an ON/OFF power switch 130. The power lead 124 and another power lead 132 for the conveyor motor 70 are then connected to a power source 134.

In use, the conveyor gate 20 may be located anywhere between two fixed conveyors 26, 28. The. T-bolts 98 may be loosened and the gussets 88 can be moved up or down, that is, longitudinally, with respect to the column 90. Further, the column 90 may be moved up or down with respect to the foot plate 102. Both of those adjustments are used to change the height of the conveyor gate 20 so that the conveyor belt 34 aligns with the conveying elements 27, 29 of the butting fixed conveyors 26, 28, respectively. The foot plate 102 may also be secured to a floor 136 by fasteners, adhesives, or other known mechanisms.

When the conveyor is in its lowered, generally horizontal, conveying position as illustrated in FIGS. 1 and 3, one of the side rails 54 is in contact with and pushing on the arm 138 of the limit switch 118, thereby closing contacts 126. Therefore, when desired, the ON/OFF switch 130 can be toggled to the ON position, thereby closing contacts 128 and applying power from the power source 134 to the motor 70 and driving the conveyor belt 34. After the conveyor 30 is turned ON, its operation is observed, and adjusting bolts 140 may be used to adjust the tracking of the conveyor belt 34 on the power roller 64, idler rollers 60, 62 and end rollers 50, 52. After the tracking is correctly adjusted, the conveyor is then ready to convey articles 142 thereacross between the abutting fixed conveyors 26, 28. Upper rail sections 144 may be attached to the upper edges of the side rails 54 to keep articles within the side boundaries of the conveyor belt 34.

If it is desired to pass through the conveyor gate 20, the handles 46 are used to raise the outer end 48 of the conveyor 30. Lifting one or both of the handles 46 causes the conveyor 30 to pivot clockwise, as viewed in FIG. 2, about the axis of rotation 42 located close to the opposite end of the conveyor 30. At the same time, the gas spring 44 applies force along the rod 110 toward the outer end 48 of the conveyor 30. That force is applied against the shoulder bolt 116 connected to the pivot block 114, and the force is effective to assist the lifting of the end 48 of the conveyor 30.

Referring to FIG. 2, immediately upon the conveyor 30 being lifted above the lowered, generally horizontal conveying position, the one of the side rails 54 disengages from and loses contact with the arm 138 of the limit switch 118. In the process of the arm 138 moving to the position illustrated in FIG. 2, the limit switch contacts 126 are opened, thereby disconnecting power from the power source 134 to the conveyor motor 70. Consequently, independent of the operation of the ON/OFF switch 130, the initial motion of lifting the conveyor gate 20 is effective to stop the conveyor belt 34. Upon the end 48 of the conveyor gate 20 being lifted to its nonconveying generally vertical elevated position, the gas spring 44 applies a force against the pivot block 114 that is sufficient to hold the end 48 of the conveyor gate 20 in its raised elevated position as shown in FIG. 2. Consequently, additional locks and latching mechanisms are not required. Raising the conveyor to the nonconveying, elevated position forms a generally unobstructed passage past the conveyor. Preferably, when in the elevated position, the side rails 54 of the conveyor gate 20 form an included angle of less than 90° with the line 145 of the lowered, generally horizontal, position.

To lower the conveyor gate 20, a downward force is applied to one or both of the handles 46, thereby pivoting the conveyor 30 counterclockwise, as viewed in FIGS. 2 about the axis of rotation 42. As shown in FIG. 3, the bores 104 in the pivot arms 80 have a centerline 146 which is slightly above the centerline of the bores 82 defined by the axis of rotation 42. Preferably, the centerline 146 is displaced vertically above the axis of rotation 42 by approximately 0.250 inches. Therefore, as the conveyor gate 20 is lowered, the gas spring 44 will reach a position of maximum compression at a point where the side rails 54 are slightly above the horizontal. As the end 48 of the conveyor gate 20 is lowered further to the lowered, generally horizontal, conveying position, the rod 110 of the gas spring 44 applies an outward directed force against the pivot block 114 which is effective to assist in holding the conveyor gate 20 in the lowered, generally horizontal, conveying position of FIG. 3. Referring to FIG. 4, each of the side rails has a stop block 150 connected to its lower edge. The stop blocks 150 contact the horizontal surfaces on the upper sides of the gussets 88 and support the conveyor gate 20 in its lowered, generally horizontal, conveying position.

The length of the conveyor 30 is determined by the distance between the end rollers 50, 52 may vary depending on the application. Further, the bracket 58 which supports the idler roller 60, 62, the drive roller 64, and conveyor motor 70 may be mounted by T-bolts 76 at different locations along the T-slots 72 of the side rails 54. Consequently, the force required to be applied to the handles 46 to lift the conveyor to its desired position will also vary. Preferably, the force required to hold the conveyor in its elevated position must be well within the maximum force that can be supplied by the gas spring 44 when the conveyor is in its elevated position. That requirement, plus the desire to minimize the force required to lift the conveyor can be achieved by changing the locations of the pivot block 74, 114, bracket 58, and handles 46 within the T-slots 72 of the side rails 54 so that conveyor 30 has the desired counter balance with respect to the axis of rotation 42.

The conveyor gate of the above described construction has the advantage of providing a self-supporting, self-contained, powered conveyor gate that effectively transfers small and light weight articles between the fixed conveyors. Further, the supporting mechanism or gas spring 44 is effective to first hold the conveyor gate in its elevated, that is, open, position, and second, to assist in maintaining the conveyor gate in its lowered, closed position.

While the invention has been set forth by a description of the illustrated embodiment in considerable detail, it is not intended to restrict or in any way limit the claims to such detail. Additional advantages and modifications will readily appear to those who are skilled in the art. For example, the gas spring 44 is preferably a nitrogen gas spring with a force generating capability of approximately 100 pounds which is commercially available from Associated Spring Raymond of the Associated Barnes Group of Maumee, Ohio. However, the gas spring 44 may be replaced by any spring-type device that helps lift the conveyor to the elevated position and has sufficient force to hold the conveyor in the elevated position. The conveyor 30 can be any self-powered conveyor section. The invention therefore in its broadest aspects is not limited to the specific details shown and described. Accordingly, departures may be made from such details without departing from the spirit and scope of the invention.

What is claimed is:

1. A conveyor gate comprising:

a base extending in a generally vertical direction and having a lower end adapted to rest on a structure;

a conveyor pivotally connected to an upper end of the base at a first location on the conveyor intermediate ends of the conveyor, the conveyor including a conveying element mounted on the conveyor for supporting articles on the conveyor, and a motor mounted on the conveyor and operatively connected to the conveying element to move the articles and the conveying element along the conveyor upon the conveyor being in a generally horizontal conveying position;

a support mechanism connected between the base and the conveyor for holding one end of the conveyor in a nonconveying, elevated position to form a generally unobstructed passage past the conveyor upon the one end of the conveyor being raised from the generally horizontal conveying position to the nonconveying, elevated position.

2. The conveyor gate of claim 1 wherein the conveying element is a looped belt mounted on the conveyor and drivingly engaged with an output shaft of the motor.

3. The conveyor gate of claim 2 further comprising a switch having switch contacts electrically connected between the motor and a power source, the switch interrupting power from the power source to the motor in response to the conveying section being moved from the conveying position.

4. A conveyor gate comprising:

a base extending in a generally vertical direction and having a lower end adapted to rest on a structure;

a conveyor pivotally connected to an upper end of the base at a first location on the conveyor intermediate ends of the conveyor, the conveyor including a motor mounted on the conveyor for powering a conveying element to move articles along the conveyor upon the conveyor being in a conveying position;

a support mechanism connected to the conveyor for holding one end of the conveyor in a nonconveying, elevated position upon the one end of the conveyor being raised from the conveying position to the elevated position, thereby permitting a generally unobstructed passage past the conveyor in the nonconveying, elevated position; and a switch having switch contacts electrically connected between the motor and a power source, the switch interrupting power from the power source to the motor in response to the conveying section being moveed from the conveying position.

5. The conveyor gate of claim 4 wherein the support mechanism has one end rotatably connected to the base and an opposite end rotatably connected to the conveyor at a second location between the first location and the one end of the conveyor.

6. The conveyor gate of claim 5 wherein the support mechanism is a spring.

7. The conveyor gate of claim 6 wherein the spring is a gas spring.

8. The conveyor gate of claim 6 wherein one end of the spring is rotatably connected to the base at a first height, and the conveyor is rotatably connected to the base at a second height lower than the first height relative to the lower end of the base.

9. The conveyor gate of claim 6 wherein one end of the spring is rotatably connected to the base at a first vertical position on the base higher than a second vertical position at which the conveyor is connected to the base, the other end of the spring having a vertical position lower than the second vertical position upon the conveyor being moved to the conveying position.

10. The conveyor gate of claim 4 wherein the base comprises a vertical column having an upper end connected to the conveyor and a foot plate connected to a lower end of the vertical column.

11. The conveyor gate of claim 4 further comprising a handle located proximate the one end of the conveyor for raising the conveyor from the conveying position to the elevated position and lowering the conveyor from the elevated position to the conveying position.

12. The conveyor gate of claim 4 further comprising a pair of handles, each of the handles being located on opposite sides of the conveyor proximate the one end of the conveyor for raising the conveyor from the conveying position to the elevated position and lowering the conveyor from the elevated position to the conveying position.

13. The conveyor gate of claim 4 further comprising a stop block connected to a lower side of the conveyor and contacting the upper end of the base when the conveyor is in the conveying position.

14. A conveyor gate comprising:

a base having a generally vertical column and having a lower end adapted to be secured to a structure;

a conveyor rotatably connected to an upper end of the base at a first location on the conveyor intermediate ends of the conveyor, the conveyor moving articles along the conveyor upon the conveyor being in a generally horizontal conveying position; and a support mechanism connected to the conveyor for automatically maintaining one end of the conveyor in a nonconveying, elevated position to form a generally unobstructed passage past the conveyor upon the one end of the conveyor being manually raised from the generally horizontal, conveying position to the nonconveying elevated position.

15. The conveyor gate of claim 14 wherein the conveyor moves through an angle of less than ninety degrees in moving between the conveying and the elevated positions.

16. The conveyor gate of claim 14 wherein the support mechanism is a gas spring.

* * * * *